US006965388B2

(12) United States Patent
Vale et al.

(10) Patent No.: US 6,965,388 B2
(45) Date of Patent: Nov. 15, 2005

(54) SYSTEM AND METHOD FOR BLOCK SCALING DATA TO FIT A SCREEN ON A MOBILE DEVICE

(75) Inventors: Peter Ormand Vale, Seattle, WA (US); Jay Franklin McLain, Woodinville, WA (US); Andrew Dadi, Carnation, WA (US)

(73) Assignee: Microsoft Corporation, Redmond, WA (US)

(*) Notice: Subject to any disclaimer, the term of this patent is extended or adjusted under 35 U.S.C. 154(b) by 64 days.

(21) Appl. No.: 10/404,675

(22) Filed: Mar. 31, 2003

(65) Prior Publication Data

US 2004/0075672 A1 Apr. 22, 2004

Related U.S. Application Data

(60) Provisional application No. 60/420,477, filed on Oct. 21, 2002.

(51) Int. Cl.[7] .......................... G06T 3/40; G09G 5/373
(52) U.S. Cl. ....................... 345/660; 345/666; 345/667
(58) Field of Search ........................ 345/660, 620–624, 345/666, 667; 715/521, 523, 525, 864

(56) References Cited

U.S. PATENT DOCUMENTS

| | | | | |
|---|---|---|---|---|
| 6,178,272 | B1 * | 1/2001 | Segman | 328/298 |
| 6,473,609 | B1 * | 10/2002 | Schwartz et al. | 455/406 |
| 6,684,087 | B1 * | 1/2004 | Yu et al. | 455/566 |
| 6,697,734 | B1 * | 2/2004 | Suomela | 701/212 |

* cited by examiner

*Primary Examiner*—Jeffery A. Brier
(74) *Attorney, Agent, or Firm*—Merchant & Gould P.C.; Joshua W. Korver

(57) ABSTRACT

The present invention is directed to a system and method for block scaling data in order to fit the data to a screen on a mobile device such that “horizontal scrolling” is minimized. The method of block scaling recursively fits blocks within other blocks within further blocks to dynamically optimize the content for a smaller screen. The block scaling is based upon a minimum width for each block depending on the type of data included in each block. The blocks are scaled to the available screen size unless the minimum width for any given block is larger than the screen of the mobile device. When the minimum width is wider than the screen, the data defaults to the minimum width in order to preserve the integrity of the data.

22 Claims, 5 Drawing Sheets

SYSTEM AND METHOD FOR BLOCK SCALING DATA TO FIT A SCREEN ON A MOBILE DEVICE

RELATED APPLICATIONS

This application claims the benefit of U.S. Provisional Application No. 60/420,477 filed on Oct. 21, 2002, which is hereby claimed under 35 U.S.C. §119(e).

FIELD OF THE INVENTION

The present invention relates generally to mobile computing, and more particularly to block scaling data to fit a screen on a mobile device.

BACKGROUND OF THE INVENTION

Small, mobile computing devices such as personal desktop assistants, including hand-held and pocket-sized computers, tablet personal computers and the like, are becoming important and popular user tools. In general, they have become small enough to be extremely convenient, while consuming less battery power, and at the same time have become capable of running more powerful applications. Although the computing circuitry of such devices continues to shrink in size, the area available for displaying data to a user shrinks as well. The usability of such data may be problematic due to the relatively small size of the display.

For example, data is often displayed in the form of a "web page" that includes text, tables, images, and other varieties of display information. The display information included on a web page is optimized to be displayed on a screen having a specified minimum size. When the size of the screen available is smaller than the specified minimum size, such as on a mobile device, the mobile device may be unable to show the display information in a usable format.

SUMMARY OF THE INVENTION

The present invention is directed to a system and method for block scaling data in order to fit the data to a screen on a mobile device such that "horizontal scrolling" is minimized. Horizontal scrolling refers to a requirement on a user to "scroll" the viewing window of the data in a horizontal direction in order to completely view the data provided. Horizontal scrolling is contrasted with "vertical scrolling." Vertical scrolling refers to a requirement on a user to "scroll" the viewing window of the data in a vertical direction. Vertical scrolling is generally accepted as a preferred method of scrolling over horizontal scrolling.

The present invention of block scaling recursively fits blocks within other blocks within further blocks to dynamically optimize the content for a smaller screen. Blocks may be defined according to the rules of a particular page, the elements included within that page, and the screen size available for a particular mobile device. Depending on the rules of a particular page, the elements are grouped into larger elements, or blocks. In one example, a page of data corresponds to a block. The block corresponding to the page is considered the top-level block and the parent block of any sub-blocks included in the page. For example, a paragraph of text on a page may be grouped as a block of data. In this example, the page is the parent block and the paragraph is a sub-block of the parent block. Further, sub-blocks may also be parent blocks for other sub-blocks of data (e.g., the paragraph includes a table). Each parent block and sub-blocks may be or may include paragraphs, images, form fields, tables, and the like.

According to the present invention, a width associated with each block and sub-block is scalable to a minimum width that depends on the type of data included in each block. The minimum width of each block is affected by the elements within each block. In one embodiment, the minimum width of a block corresponds to the width of the longest unbreakable word, the widest image, the widest form field, or the like.

When each block is scaled, the elements within each block are allowed to flow such that the block is held to its minimum width and horizontal scaling is reduced. If the minimum width of a sub-block is larger than its corresponding parent block, the width of the parent block is increased to match the minimum width of the sub-block. The data of the sub-block is preserved by not reducing the sub-block past its minimum width. The process of matching a parent's width with the minimum width of a sub-block is recursive. Each successive parent block is increased to match any increases in the width of any sub-blocks.

DESCRIPTION OF THE PREFERRED EMBODIMENT

Briefly stated, the present invention is directed at scaling data provided to a mobile device to fit a screen associated with the mobile device while minimizing horizontal scrolling. These and other aspects of the invention will become apparent to those skilled in the art after reading the following detailed description.

Illustrative Operating Environment

Figure 1:
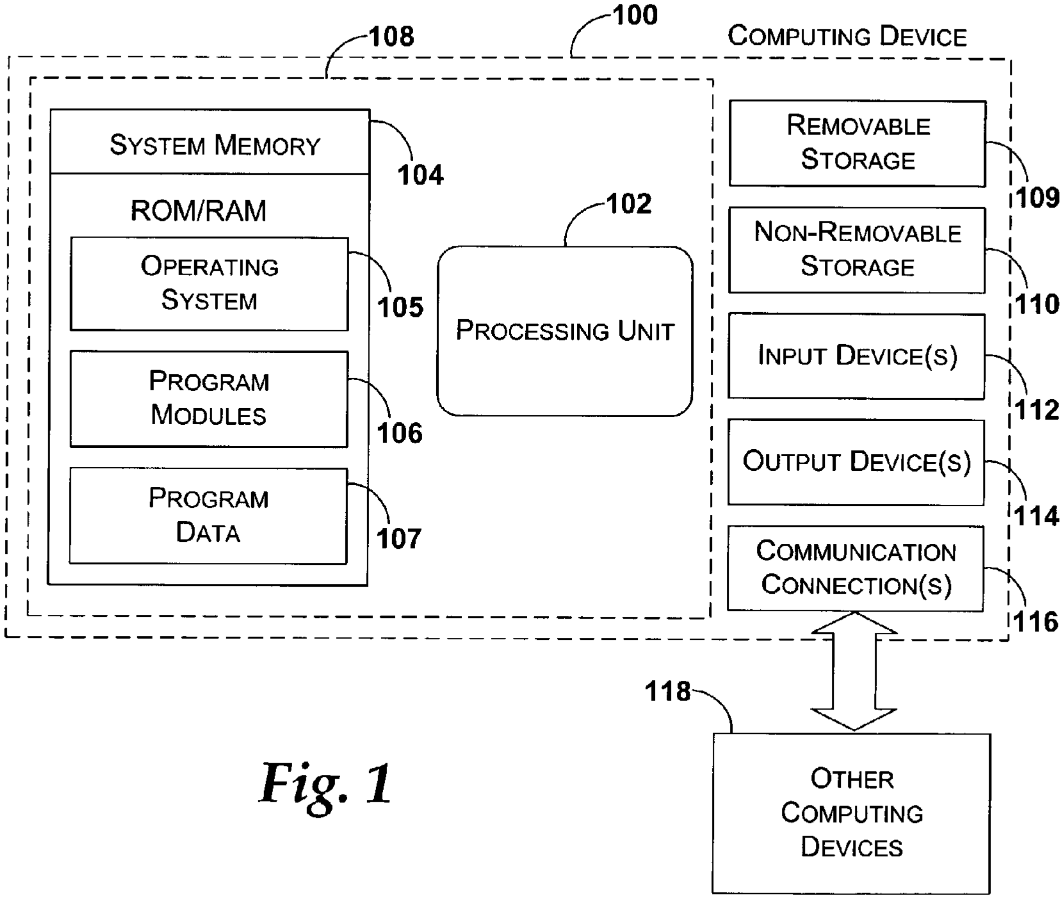
FIG. 1 illustrates an exemplary computing device that may be used in one exemplary embodiment of the present invention.

With reference to FIG. 1, one exemplary system for implementing the invention includes a computing device that may be configured to operate as a mobile device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
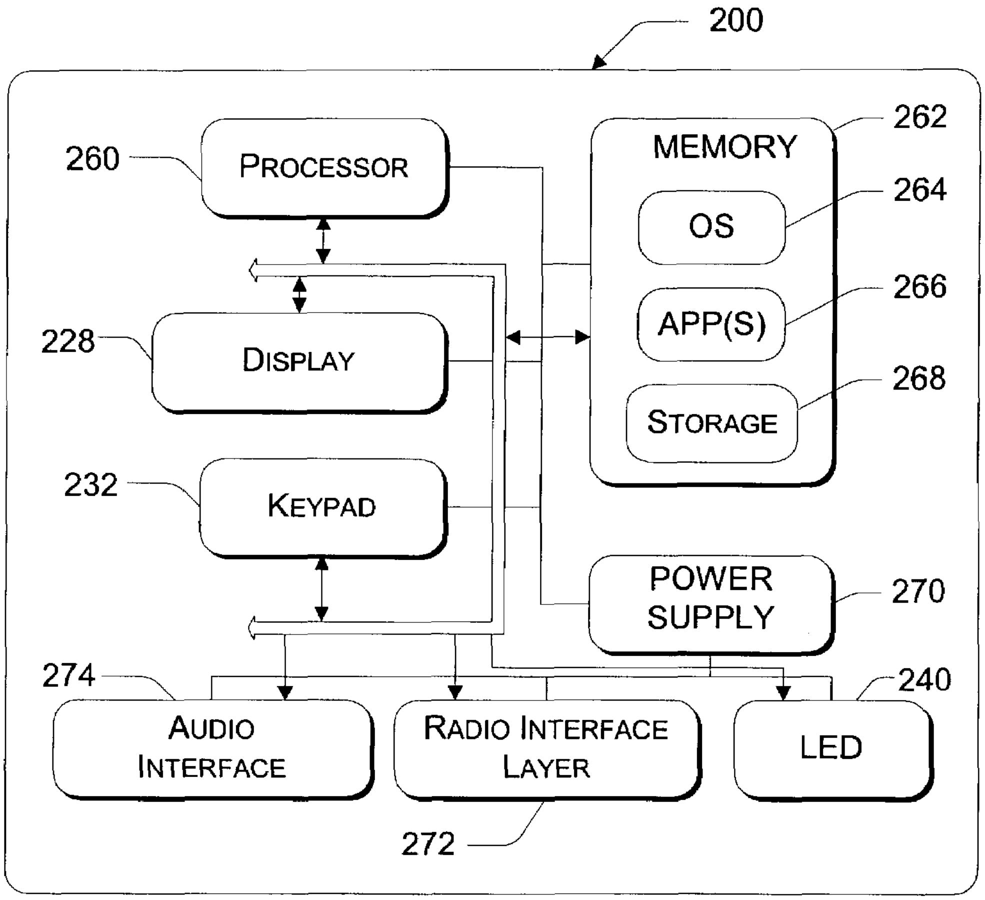
FIG. 2 illustrates an exemplary mobile device that may be used in one exemplary embodiment of the present invention.

With reference to FIG. 2, one exemplary system for implementing the invention includes a computing device configured as a mobile device, such as mobile device 200. The mobile device 200 has a processor 260, a memory 262, a display 228, and a keypad 232. The memory 262 generally includes both volatile memory (e.g., RAM) and non-volatile memory (e.g., ROM, Flash Memory, or the like). The mobile device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile devices. The display 228 may be touch-sensitive, and would then also act as an input device. The peripheral device port 230 may be of the type to accept additional memory cards, game cards, modem cards, or other peripheral devices.

One or more application programs 266 are loaded into memory 262 and run on the operating system 264. Examples of application programs include phone dialer programs, installation wizard programs, email programs, scheduling programs, PIM (personal information management) programs, word processing programs, spreadsheet programs, Internet browser programs, data scaling programs, and so forth. The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing program, device driver programs, and the like.

The mobile computing device 200 has a power supply 270, which may be implemented as one or more batteries. The power supply 270 might further include an external power source, such as an AC adapter or a powered docking cradle, that supplements or recharges the batteries.

The mobile computing device 200 is also shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a radio interface layer 272 that performs the function of transmitting and receiving radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

Illustrative Process for Block Scaling Data to Fit a Mobile Device Screen

Figure 3:
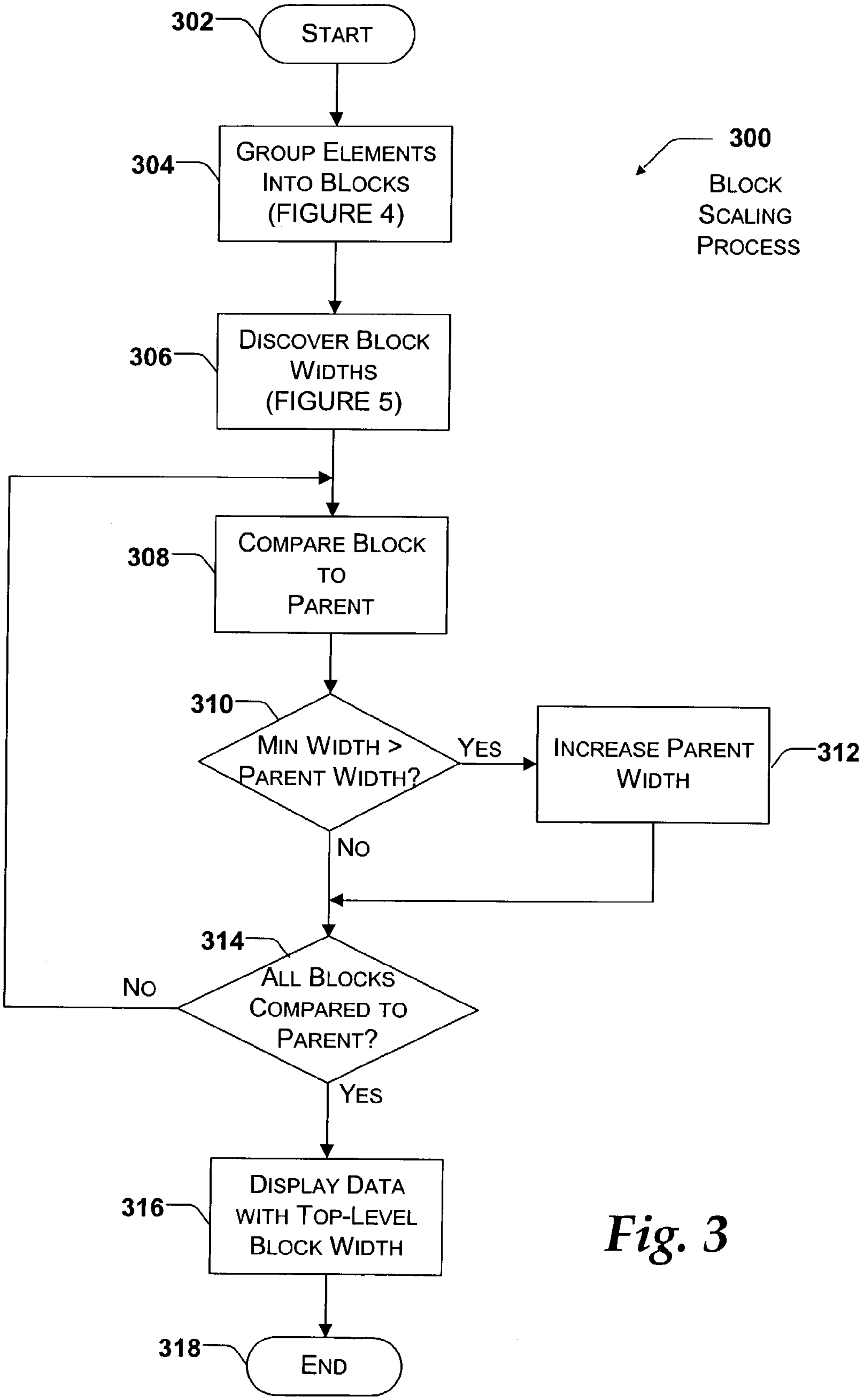
FIG. 3 is a logical flow diagram of an exemplary block scaling process according to the present invention.

FIG. 3 is a logical flow diagram of an exemplary block scaling process according to the present invention. The process 300 begins at start block 302 where the mobile device is powered on and has received a page or other data to display on the mobile device. In one embodiment, the page is a web page that is written according to a standard such as HTML, XHTML, CSS, or the like. The process 300 continues at block 304.

At block 304, the elements of the page are grouped in blocks. For example, a paragraph may be considered a block of text elements. An image on a page may be considered another block. Since pages often have elements within other elements, it is also possible to have sub-blocks within larger parent blocks. In one embodiment, text is not a block. Accordingly, the words within the paragraph flow such that the text fits within the paragraph block when the paragraph block is scaled. With a goal of reducing horizontal scrolling rather than vertical scrolling, the height of a block is allowed to grow if necessary to make the width of the block fit within its parent. The top-level parent block uses the screen width for its limit. This way, if sub-blocks can be scaled appropriately, horizontal scrolling is avoided. In another embodiment, standards associated with a page define which elements are considered blocks. For example, web pages are based on standards such as HTML, XHTML, CSS, and the like, that may be used to define which elements are considered blocks. Those elements not considered blocks can flow and move around within a block when scaling to fit within the block's width. The non-block elements also have certain limits to the amount they are able to be scaled or move in order to meet the block's needs. These limits cause the block to reach a minimum width. An illustrative process for grouping the elements into blocks is further described in the discussion of FIG. 4 below. Once the page of data is grouped into blocks, processing proceeds to block 306.

At block 306, the width of each block of the page of data is discovered. In one embodiment, the top-level block (e.g., the block containing all other sub-blocks of the page) has a default width that is set to correspond to the width of the screen on the mobile device as described in greater detail in FIG. 5. Accordingly, the width of the page of data matches the width of the screen if all the blocks have a minimum width that is less than the width of the screen. Horizontal scrolling is eliminated when the width of the blocks is less than the width of the screen. An illustrative process for discovering the width of the blocks for the page of data is described in more detail in the discussion of FIG. 5 below. Processing continues at block 308.

At block 308, each block of the page of data is compared to its immediate parent block (i.e., the parent block directly higher). The block may have a width that is greater than its parent block as described in the discussion of FIG. 5. As the blocks are compared to their immediate parents, processing proceed to decision block 310.

At decision block 310, a determination is made whether the minimum width of the block is greater than the width of its parent block. If the width of the block is not greater than the width of its parent, processing advances to decision block 314. However, if the width of the block is greater than the width of its parent, processing moves to block 312.

At block 312, the width of the immediate parent is increased to correspond to the minimum width of the block. The process for increasing each parent block is recursive, with each higher level parent block also being increased. If each succeeding parent block is required to increase its width, ultimately the top-level block also increases its width to accommodate. Increasing the width of the top-level block may result in a minimum level of horizontal scrolling to completely view the page of data and maintain the data usability. Processing proceeds to decision block 314.

At decision block 314, a determination is made whether the width of each block of the data page has been compared to the width of its immediate parent block. In one embodiment, if the width of any block is changed according to the process of block 312, then the determination at block 314 is that not all blocks have been compared to their immediate parent. If not all blocks have been compared to their immediate parent, then processing returns to block 308 where each block is compared to its immediate parent. Alternatively, if all blocks have been compared to their immediate parent without any further changes in width for a block, then processing moves to block 316.

At block 316, the page of data is fitted to or displayed on the screen of the mobile device according to the width of the top-level block. Each block lower in the hierarchy is also has a width corresponding to the top-level block. Accordingly, usability of the mobile device for viewing the page of data is increased by optimizing the data presented on the screen and minimizing horizontal scrolling. Processing then proceeds to block 318, where the process ends.

In a further embodiment, non-block content (e.g., text) contained within a block is limited to a width no greater than the screen width of the mobile device. The non-block content width is limited even if the minimum width of the block is greater than the width of the screen. For example, a table may be included in the page of data that is grouped as a block with the cells of the table as sub-blocks. The minimum width for one of the cell sub-blocks may be greater than the width of the screen, increasing the minimum width of the block. Despite that the block corresponding to the table is greater in width than the screen, text within the block is limited to a width corresponding to the screen width. Accordingly, horizontal scrolling may be avoided for long text paragraphs within a block even when the block is wider than the width of the screen.

Figure 4:
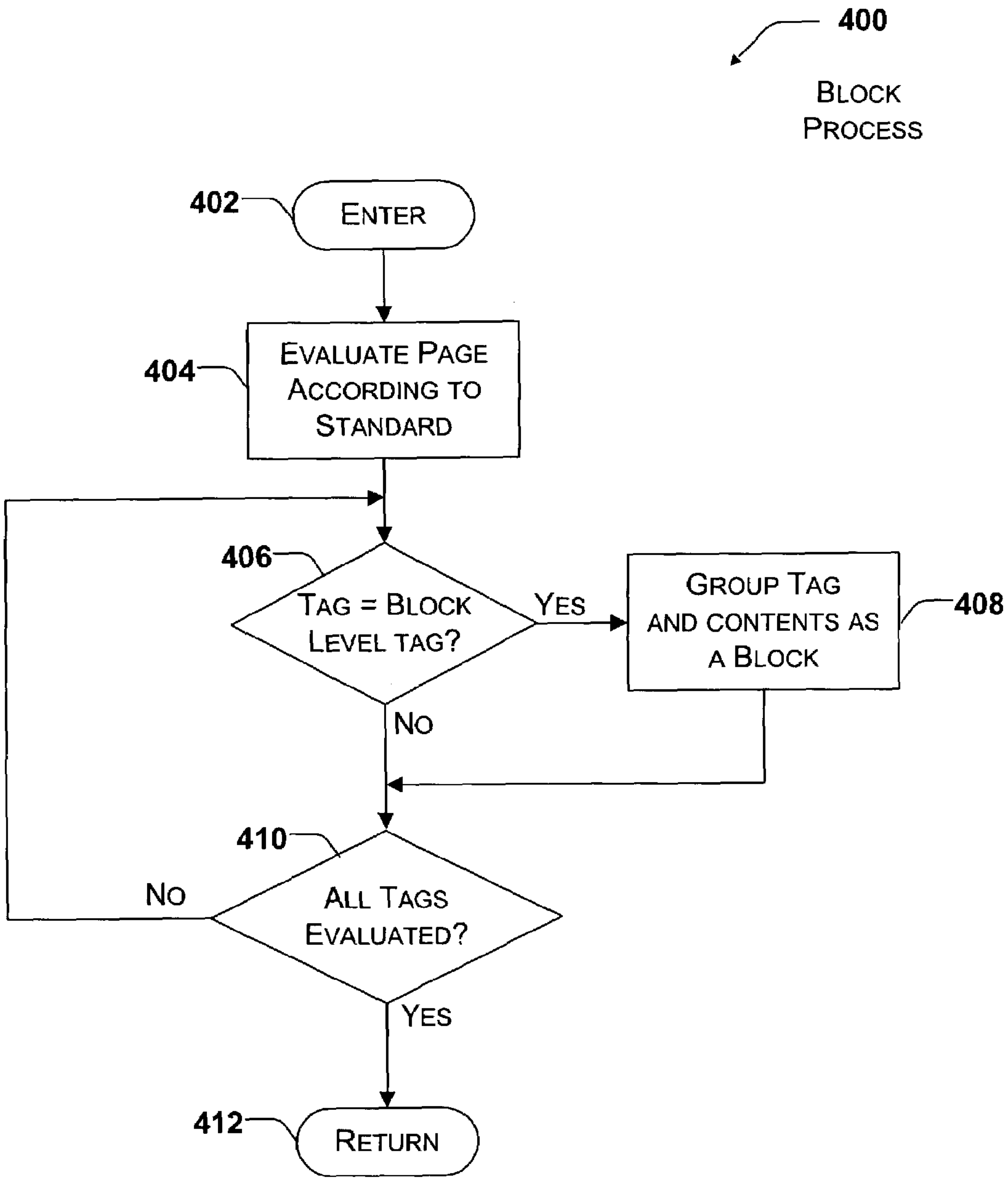
FIG. 4 is a logical flow diagram of an exemplary block grouping process according to the present invention.

FIG. 4 is a logical flow diagram of an exemplary block grouping process according to the present invention. The process 400 enters at block 402 when process 300 shown in FIG. 3 enters block 304. The process 400 continues at block 404.

At block 404, the page is evaluated according to a standard such as the HTML standard previously mentioned. HTML defines the structure and layout of a Web document by using a variety of tags and attributes. The tags can correlate to "block level" data or data that is not block level. For example, HTML includes a set of tags that designates the start and end of a paragraph. The tag for a paragraph is considered a "block level" tag that designates a set of data that may be grouped as a block. The data between these tags can therefore be grouped as a block for scaling. As the page of data is evaluated according to the standard in which it was written, processing moves to decision block 406.

At decision block 406, a determination is made for whether a tag evaluated in the page of data is a "block level" tag. If the tag corresponds to a "block level" tag, meaning that the data framed by the tag and its corresponding end tag may be organized into a block, processing moves to block 408.

At block 408, the data included within the "block level" set of tags are grouped as a block. Block level tags may include tags that correspond to paragraphs, images, tables, and the like. Once the data corresponding to the block level set of tags is grouped as a block, processing moves to decision block 410.

Alternatively, at decision block 406, if the tag and its corresponding end tag are not block level tags, the set of tags may be associated with text or other elements not considered block level data. When a determination is made that the tags do not correspond to block level data, processing advances directly to decision block 410.

At decision block 410, a determination is made whether all tags within the page have been evaluated to group block level data into blocks. The tags within an HTML page are nested, such that grouping data according to its corresponding tags may generate blocks within other blocks. As described previously, each block may be a sub-block of an associated parent block. The parent block at the highest level, or the top-level block, is the block corresponding to the page itself. If all tags of the page of data have not yet been evaluated, processing returns to block 406, where evaluation continues. Alternatively, when all tags have been evaluated and the corresponding data is grouped into blocks, processing continues to block 412. At block 412, processing returns to block 306 of process 300 shown in FIG. 3.

In other embodiments, process 400 may be evaluated and grouped according to other elements than tags, or according to tags of a different standard than HTML.

Figure 5:
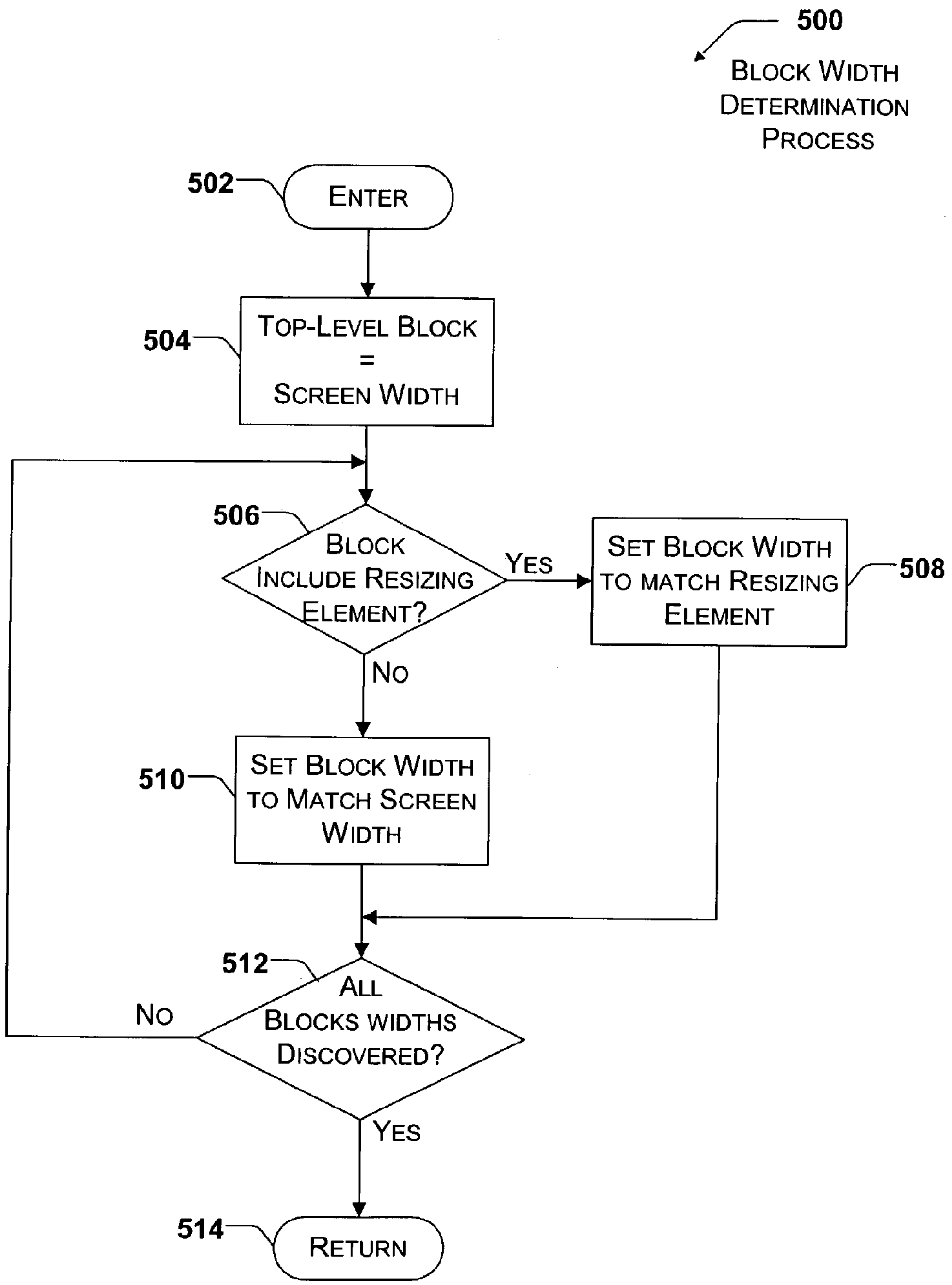
FIG. 5 is a logical flow diagram of an exemplary block width determination process according to the present invention.

FIG. 5 is a logical flow diagram of an exemplary block width determination process according to the present invention. The process 500 enters at block 502 when process 300 shown in FIG. 3 enters block 306. The process 500 continues at block 504.

At block 504, the width of the highest level block, or top-level block that corresponds to the page of data is set to be scaled to a width that corresponds to the width of the screen of a mobile device. When the page of data is displayed on the mobile device, the width of the page therefore matches the width of the screen. Matching the page width to the width of the screen avoids horizontal scrolling if the sub-blocks are scaled appropriately. Processing continues at decision block 506.

At decision block 506, each block is examined and a determination is made whether a block includes a "resizing element." A "resizing element" as used herein refers to an element that results in a block that is wider than the screen size when the block is scaled to preserve the integrity of the data. Each block has a "minimum width" that depends on the type of data included in the block. For example, a single word that cannot be broken at a logical place is one of the elements that may cause a block's minimum width to be different from the screen width. Other elements include: a single image that cannot be scaled any smaller without sacrificing usability of the image, a single form field using a standard shell control that cannot be made any smaller, a table that requires columns of a minimum width, and the like. If one of these elements results in the width of a block being wider than the screen width, the element is considered a "resizing element." If a block includes a resizing element, processing moves to block 508.

At block 508, the width of the block is set to scale according to the width of the resizing element. Scaling the block according to the width of the resizing element preserves the integrity of the data included within the block while minimizing horizontal scrolling of the page when view on the mobile device. When the width of the block is set, processing advances to decision block 512.

Alternatively, if the block being examined does not include a resizing element, processing moves to block 510 where the width of the block is set to be scaled according to the width of the screen. Scaling the block to match the width of the screen maximizes the size of each block to increase usability of the data included on the page, while minimizing horizontal scrolling. When the width of the block is set, processing advances to decision block 512.

At decision block 512, a determination is made whether all block widths have been discovered. If the widths for all the blocks, including all sub-blocks, has not yet been determined, processing returns to block 506, where examination of the blocks continues. Alternatively, when all block width have been determined, processing continues to block 514. At block 514, processing returns to block 308 of process 300 shown in FIG. 3.

The above specification, examples and data provide a complete description of the method and use of the invention. Since many embodiments of the invention can be made without departing from the spirit and scope of the invention, the invention resides in the claims hereinafter appended.

We claim:

1. A computer-implemented method for block scaling data to fit a screen on a mobile device, the method comprising:
- grouping elements of the data into a first block and a second block, wherein the second block is a sub-block of the first block;
- determining a width for the first block and a width for the second block;
- comparing the width of the first block to the width of the second block;
- increasing the width of the first block when the width of the second block is greater than the width of the first block; and
- scaling the data associated with the first block and the second black according to their respective widths to display data on the screen such that horizontal scrolling is minimized.

2. The computer-implemented method of claim 1, wherein the grouping further comprises evaluating the page of data according to a standard that define the data of the page that is block level data.

3. The computer-implemented method of claim 2, wherein the standard corresponds to one of the group comprising HTML, XHTML, and CSS.

4. The computer-implemented method of claim 1, wherein the first block is the top-level block for the page of data.

5. The computer-implemented method of claim 1, wherein the width of the second block corresponds to one of a group comprising a longest unbreakable word associated with the second block, a widest image associated with the second block and a widest form field associated with the second block.

6. The computer-implemented method of claim 1, wherein the width of the first block corresponds to one of a group comprising a longest unbreakable word associated with the first block, a widest image associated with the first block, a widest form field associated wit the first block, and the width associated with the second block.

7. The computer-implemented method of claim 1, further comprising determining whether the second block includes a resizing clement, wherein a width associated with the resizing element is wider than the width of the screen on the mobile device.

8. The computer-implemented method of claim 7, further comprising increasing the width associated with the second block to match the width of the resizing element when the resizing element is present in the second block.

9. The computer-implemented method of claim 7, further comprising setting the width of a first block to match the width corresponding to the screen on the mobile device when a resizing element is not present in the second block.

10. A mobile device, comprising:
- a processor;
- a display;
- a memory into which a plurality of computer-executable instructions are loaded, the computer-executable instructions causing the processor to perform a method comprising:
- grouping elements of a page of data into a first block and a second block;
- comparing a width associated with the first block to a width associated with the second block;
- increasing the width of the first block when the width of the second block is greater than the width of the first block; and
- scaling the data associated with the first block and the second block according to their respective widths to display data on the screen such that horizontal scrolling is minimized.

11. The mobile device of claim 10, wherein the computer-executable instructions further cause the processor to determine a minimum width for the second block, wherein the minimum width corresponds to one of a group comprising a longest unbreakable word associated with the second block, a widest image associated with the second block, and a widest form field associated with the second block.

12. The mobile device of claim 10, wherein the computer-executable instructions further cause the processor to determine whether the second block includes a resizing element, wherein a width associated with the resizing element is wider than the width of the screen on the mobile device.

13. The mobile device of claim 12, wherein the computer-executable instructions further cause the processor to increase the width associated with the second block to match the width of the resizing element when the resizing element is present in the second block.

14. The mobile device of claim 12, wherein the computer-executable instructions further cause the processor to set the width of a first block to match the width corresponding to the screen on the mobile device when a resizing element is not present in the second block.

15. A computer-readable medium encoded with computer-executable instructions causing a computing device to perform a method comprising:

grouping elements of a page of data into a first block and a second block;

setting a width of the first block to match a width corresponding to a screen on the mobile device;

comparing the width associated with the first block to a width associated with the second block;

increasing the width of the first block when the width of the second block is greater than the width of the first block; and scaling the elements associated with the first block and the second block according to their respective widths to display the page of data on the screen such that horizontal scrolling is minimized.

16. The computer-readable medium of claim 15, wherein the second block is a sub-block of the first block, and the first block is a parent block of the second block.

17. The computer-readable medium of claim 15, wherein the first block is the top-level block for the page of data.

18. The computer readable medium of claim 15, further comprising determining a minimum width for the second block, wherein the minimum width corresponds to one of a group comprising a longest unbreakable word associated with the second block, a widest image associated with the second block, and a widest form field associated with the second block.

19. The computer readable medium of claim 15, further comprising determining whether the second block includes a resizing element, wherein a width associated with the resizing element is wider than the width of the screen on the mobile device.

20. The computer readable medium of claim 19, further comprising increasing the width associated with the second block to match the width of the resizing element when the resizing element is present in the second block.

21. The computer readable medium of claim 19, further comprising setting the width of a first block to match the width corresponding to the screen on the mobile device when a resizing element is not present in the second block.

22. The computer readable medium of claim 15, further comprising setting a width of non-black elements within the first block to correspond to the width of the screen when the width of the first block is greater than the width of the screen.

* * * * *

UNITED STATES PATENT AND TRADEMARK OFFICE

CERTIFICATE OF CORRECTION

PATENT NO. : 6,965,388 B2
APPLICATION NO. : 10/404675
DATED : November 15, 2005
INVENTOR(S) : Peter Ormand Vale et al.

It is certified that error appears in the above-identified patent and that said Letters Patent is hereby corrected as shown below:

In column 8, line 7, in Claim 1, delete “black” and insert -- block --, therefor.

In column 8, line 24, in Claim 5, after “second block” insert -- , --.

In column 8, line 30, in Claim 6, delete “wit” and insert -- with --, therefor.

In column 8, line 34, in Claim 7, delete “clement” and insert -- element --, therefor.

In column 10, line 28, in Claim 22, delete “non-black” and insert -- non-block --, therefor.

Signed and Sealed this

Twenty-eighth Day of July, 2009

John Doll

JOHN DOLL
*Acting Director of the United States Patent and Trademark Office*